(12) United States Patent
Negre et al.

(10) Patent No.: US 6,327,858 B1
(45) Date of Patent: Dec. 11, 2001

(54) AUXILIARY POWER UNIT USING COMPRESSED AIR

(76) Inventors: Guy Negre; Cyril Negre, both of 4e ave. BP 547, Carros Cedex (FR), F-06516

( * ) Notice: Subject to any disclaimer, the term of this patent is extended or adjusted under 35 U.S.C. 154(b) by 0 days.

(21) Appl. No.: 09/744,236

(22) PCT Filed: Jul. 27, 1999

(86) PCT No.: PCT/FR99/01834

§ 371 Date: Jan. 25, 2001

§ 102(e) Date: Jan. 25, 2001

(87) PCT Pub. No.: WO00/07278

PCT Pub. Date: Feb. 10, 2000

(30) Foreign Application Priority Data

Jul. 27, 1998 (FR) .................................................. 98 09799

(51) Int. Cl.[7] .................................................. F01K 25/02
(52) U.S. Cl. .............................................. 60/650; 60/659
(58) Field of Search ............................. 60/643, 650, 659

(56) References Cited

U.S. PATENT DOCUMENTS

| 4,347,706 | * | 9/1982 | Drost ...................................... 60/659 |
| 4,479,352 | * | 10/1984 | Yamaoka et al. ...................... 60/659 |
| 5,296,799 | * | 3/1994 | Davis ..................................... 322/25 |
| 5,448,889 | * | 9/1995 | Bronicki .............................. 60/659 X |
| 5,537,822 | * | 7/1996 | Shnaid et al. .......................... 60/659 |

FOREIGN PATENT DOCUMENTS

| 2363103 | * | 6/1975 | (DE) . |
| 07042573 | * | 10/1995 | (EP) . |
| 2758589 | * | 1/1997 | (FR) . |

* cited by examiner

*Primary Examiner*—Hoang Nguyen
(74) *Attorney, Agent, or Firm*—Jacobson Holman, PLLC

(57) ABSTRACT

The invention concerns an auxiliary power unit using compressed air for energy and equipped with a motor alternator driving, or being driven by a motor compressor with compressed air which compresses air under high pressure in a high pressure storage tank and which when there is a power cut automatically drives the motor compressor in alternating mode to supply electricity. The invention is applicable to fixed or mobile auxiliary power units.

12 Claims, 1 Drawing Sheet

AUXILIARY POWER UNIT USING COMPRESSED AIR

The invention relates to a back-up generator set operating on compressed air.

Current generator sets mainly comprise an alternator tasked with producing electricity while they are running, driven by a combustion engine running on petrol, diesel or some other gas. These engines are particularly noisy and polluting and consume expensive energy which has frequently to be replenished. Systems allowing the use of compressed air as a reserve of energy have been described, in particular, in patent U.S. Pat. No. 5,296,799, but use complex solutions involving numerous parts with an air compressor, a compressed-air motor, an alternator and an electric motor.

The author has filed numerous published patent applications, WO 96/27737, WO 97/48884, WO 98/12062, WO 98/15440, regarding the use of compressed air as energy storage, particularly for driving vehicle engines or for other uses.

The generator set according to the invention sets out to solve the problems associated with supplying generator sets with fuel, by using compressed air to operate it; it comprises a reversible compressed-air motor which can operate either as a motor or as a compressor—compressed-air motor-compressor—driven by, or driving an electric motor which is also reversible and which can operate as a generator—motor-generator. During operation, the motor-generator, in electric motor mode, which receives its power from an electricity network, for example the town mains, runs, driving the compressed-air motor-compressor which is therefore in compressor mode and fills one or more high-pressure, for example 200 bar, compressed-air reservoirs and keeps them full. When there is a break in the electricity supply, for example during a power cut, the motor-compressor is automatically switched into motor mode and, powered with energy by the compressed air contained in the storage reservoir or reservoirs, it drives the motor-generator which has also been automatically switched into generator mode to supply electricity.

The switch from one mode of operation to the other is managed by an electromechanical, electronic or some other device.

As a preference, the back-up generator set according to the invention comprises a system for recuperating ambient thermal energy as described by the author in his patent application No. FR 97/00851, where the compressed air contained in the storage reservoir at very high pressure, for example 200 bar, and at ambient temperature, for example 20 degrees C., prior to its end use in the motor-compressor, at a pressure below 30 bar for example, has its pressure reduced to a pressure close to that needed for its end use, in a variable-volume system, for example a piston in a cylinder, producing work which can be recuperated and used by any known means, mechanical, electrical, hydraulic or other. This pressure reduction with work has the result of cooling the compressed air which has had its pressure reduced to a pressure close to the service pressure to a very low temperature, for example minus 100° C. This pressure-reduced compressed air at its service pressure and at a very low temperature is then sent into an exchanger with the ambient air, is reheated to a temperature close to ambient temperature, and thus increases its pressure and/or its volume, recuperating the heat energy taken from the atmosphere.

As another preference, the engine operating method according to the invention comprises a thermal heating system as described by the author in his patent application FR 98/00877, in which he proposes a solution which allows the amount of usable and available energy to be increased, characterized by the fact that the compressed air, before being let into the engine combustion and/or expansion chamber, coming from the storage reservoir either directly or after passing through the air-air heat exchanger and before being let into the combustion chamber is routed through a heater in which its pressure and/or volume increases still further before it is let into the combustion and/or expansion chamber, thus considerably improving performance still further.

When the back-up generator set is used in buildings supplied with town gas, the heater may advantageously be supplied with the said town gas.

The back-up generator set according to the invention may be installed in a set location in buildings or other private dwellings. It may also be fitted to a mobile unit which will be powered with electricity and have its reservoirs filled before being used on outdoor sites.

Other objects, advantages and features of the invention will emerge from reading the description, with no implied limitation, of several embodiments, which is given with reference to the appended drawings in which:

BRIEF DESCRIPTION OF THE DRAWINGS

The single FIGURE represents a block diagram of the operation of the generator in this invention.

DETAIL DESCRIPTION OF THE DRAWINGS

Figure 1:
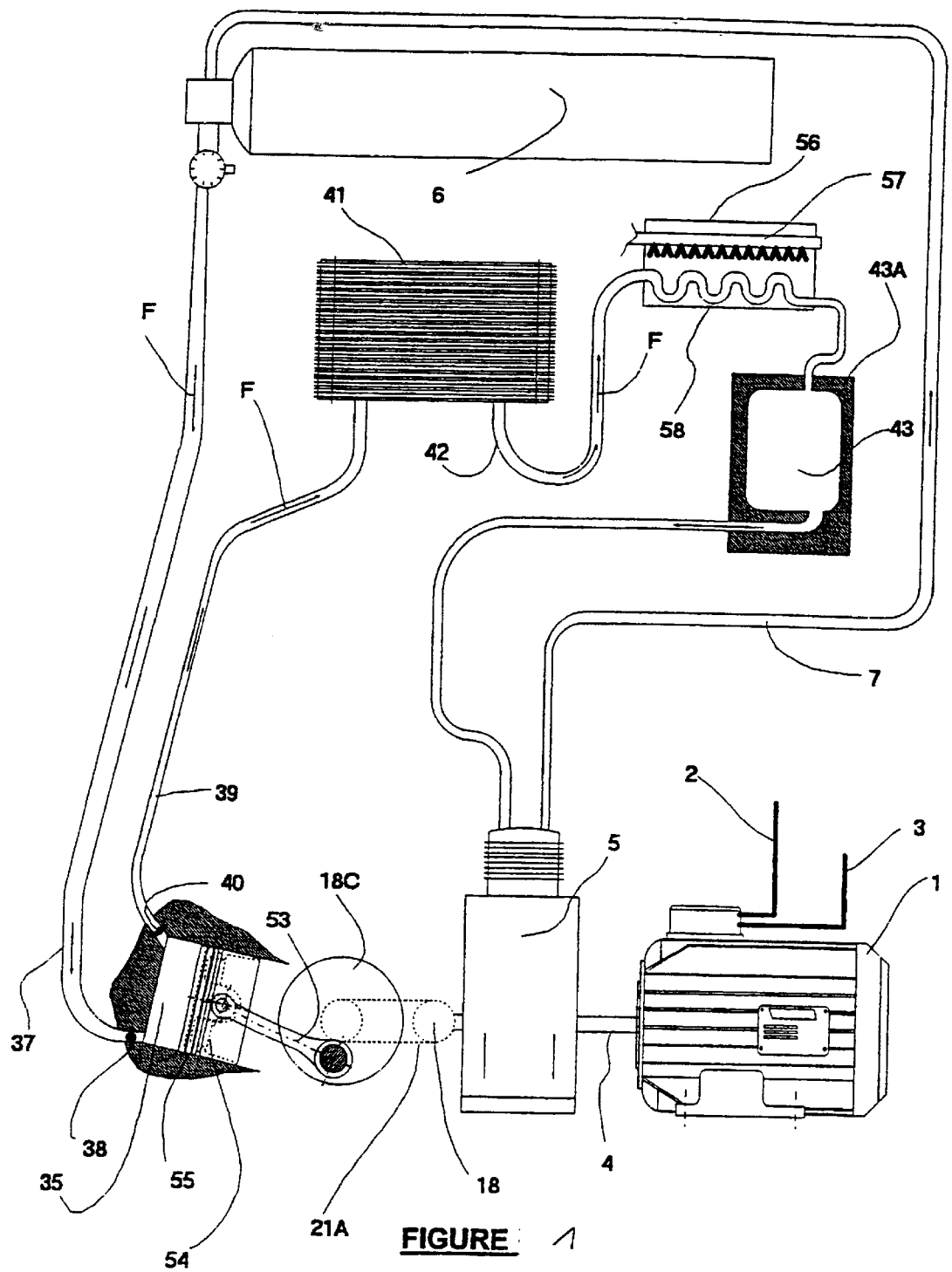

The single FIGURE represents a block diagram of the operation of the generator set according to the invention, in which the electric motor-generator 1 powered from the electricity network by an electric cable 2 or powering the electricity network by an electric cable 3 driving, or being driven through a transmission 4 by the motor-compressor 5 which in compressor mode fills a high-pressure storage reservoir 6 via a pipe 7 and which in compressed-air motor mode receives from the storage reservoir 6 compressed air which has already had its pressure reduced, with work, in a variable-volume device allowing a considerable reduction in the temperature of the air whose pressure is reduced to a pressure approximately equivalent to the working pressure of the motor-compressor the pressure reduction with work of the high-pressure compressed air stored in the reservoir 6 is performed in an assembly comprising connecting rod 53 and working piston 54, coupled directly to a crankshaft 18C connected to the motor crankshaft 18 by a transmission 21A. This piston 54 slides in a blind cylinder 55 and determines a working chamber 35 into which there open, on the one hand, a high-pressure air intake pipe 37, the opening and closure of which are controlled by an electrically operated valve 38 and, on the other hand, an exhaust pipe 39 connected to an air-air heat exchanger or radiator 41 itself connected by a pipe 42 to a buffer volume 43 at almost constant end-use pressure, itself equipped with thermal insulation 43A. During operation when the working piston 54 is at its top dead center, the electrically operated valve 38 is opened then closed again to admit a charge of very high pressure compressed air which will expand, driving the piston 54 back to its bottom dead center, producing work, and via the connecting rod 53 drive the crankshaft 18C and via the transmission 21A drive the crankshaft of the motor-compressor 18. During the upstroke of the piston 54, the exhaust electrically operated valve 40 is then opened and the compressed air whose pressure has been practically reduced to the service pressure and at very low temperature contained in the working chamber is discharged (in the direction of the arrow F) into the air-air exchanger or radiator 41. This air will thus be heated up to a temperature close to ambient temperature and will increase in volume as it reaches the buffer volume 43, having recuperated a not-insignificant amount of energy from the atmosphere.

Between the air-air exchanger 41 and the buffer volume 43, on the pipe 42, there is also a heater 56, consisting of burners 57 which will considerably increase the temperature and therefore the pressure and/or the volume of the compressed air from (in the direction of the arrows F) the air-air exchanger 41 as it passes through the exchange coil 58.

The modes of switching, the types of motor-generator and motor-compressor, the design of the storage reservoirs and their volume may of course employ known or unknown methods without in any way changing the principle of the invention which has just been described.

What is claimed is:

1. Back-up generator set operating on reserves of compressed air, characterized in that the compressed-air motor is reversible and operates either in compressed-air motor mode or in compressed-air compressor mode—compressed-air motor-compressor (5)—driven by, or driving, an electric motor which is also reversible which can act as a generator—motor-generator (1)—in which, during operation, the motor-generator in electric motor mode which receives its energy from an electricity network, runs, driving the compressed-air motor-compressor, operating in compressor mode, which fills one or more high-pressure compressed-air reservoirs and keeps them full and in which, when there is a break in the electrical power supply, the motor-compressor is automatically switched to motor mode and powered with energy by the compressed air contained in the storage reservoir or reservoirs (6) and drives the motor-generator which has also automatically been switched into generator mode to provide back-up electrical power.

2. Back-up generator set according to claim 1, characterized in that, prior to being let into the motor-compressor, the compressed air contained in the high-pressure storage reservoir (6) has its pressure reduced with work producing a drop in its temperature and is then sent to an exchanger (41) with ambient air to be heated up again and thus have its pressure and/or its volume increased, recovering ambient thermal energy.

3. Back-up generator set according to claim 1 characterized in that, prior to being let into the motor-compressor, the compressed air from the storage reservoir is routed, either directly or after it has passed through the air-air heat exchanger, through a thermal heater (56) to further increase its pressure and/or its volume.

4. Back-up generator set according to claim 3, characterized in that the energy used for the thermal heater is town gas.

5. Back-up generator set according to claim 1, characterized in that the entire generator set with its storage reservoir and its accessories is mounted on a mobile body which allows it to be used on an outdoor site.

6. Back-up generator set according to claim 2, characterized in that, prior to being let into the motor-compressor, the compressed air from the storage reservoir is routed, either directly or after it has passed through the air-air heat exchanger, through a thermal heater (56) to further increase its pressure and/or its volume.

7. Back-up generator set according to claim 6, characterized in that the energy used for the thermal heater is town gas.

8. Back-up generator set according to claim 2, characterized in that the entire generator set with its storage reservoir and its accessories is mounted on a mobile body which allows it to be used on an outdoor site.

9. Back-up generator set according to claim 3, characterized in that the entire generator set with its storage reservoir and its accessories is mounted on a mobile body which allows it to be used on an outdoor site.

10. Back-up generator set according to claim 4, characterized in that the entire generator set with its storage reservoir and its accessories is mounted on a mobile body which allows it to be used on an outdoor site.

11. Back-up generator set according to claim 6, characterized in that the entire generator set with its storage reservoir and its accessories is mounted on a mobile body which allows it to be used on an outdoor site.

12. Back-up generator set according to claim 7, characterized in that the entire generator set with its storage reservoir and its accessories is mounted on a mobile body which allows it to be used on an outdoor site.

* * * * *